United States Patent [19]

Wise

[11] 4,454,936
[45] Jun. 19, 1984

[54] EMERGENCY AND PARKING BRAKE ARRANGEMENT IN VEHICLE BRAKING SYSTEM

[76] Inventor: Stanley S. Wise, P.O. Box 3905, Lantana, Fla. 33462

[21] Appl. No.: 364,509

[22] Filed: Apr. 1, 1982

[51] Int. Cl.³ .............................................. B60K 41/26
[52] U.S. Cl. ................................. 192/4 A; 74/480 R; 74/481
[58] Field of Search ............... 192/4 R, 4 A, 480 R, 192/481; 188/151 A, 106; 303/9; 74/474, 481

[56] References Cited

U.S. PATENT DOCUMENTS

| | | | |
|---|---|---|---|
| 3,003,605 | 10/1961 | Apple | 192/4 A |
| 3,299,999 | 1/1967 | Martin | 192/4 A |
| 3,703,941 | 11/1972 | Ohie et al. | 192/4 A |

Primary Examiner—George H. Krizmanich
Assistant Examiner—M. Manley
Attorney, Agent, or Firm—Oltman & Flynn

[57] ABSTRACT

The vehicle braking system has an arrangement for applying the brakes in an emergency caused by loss of hydraulic fluid by depressing the brake pedal beyond its normal travel. The system also can apply the brakes for parking by shifting the gear shift lever to the park position and depressing the brake pedal. In both cases, the foot pedal operated brakes of the vehicle are operated without any need for separate parking or emergency brakes.

4 Claims, 7 Drawing Figures

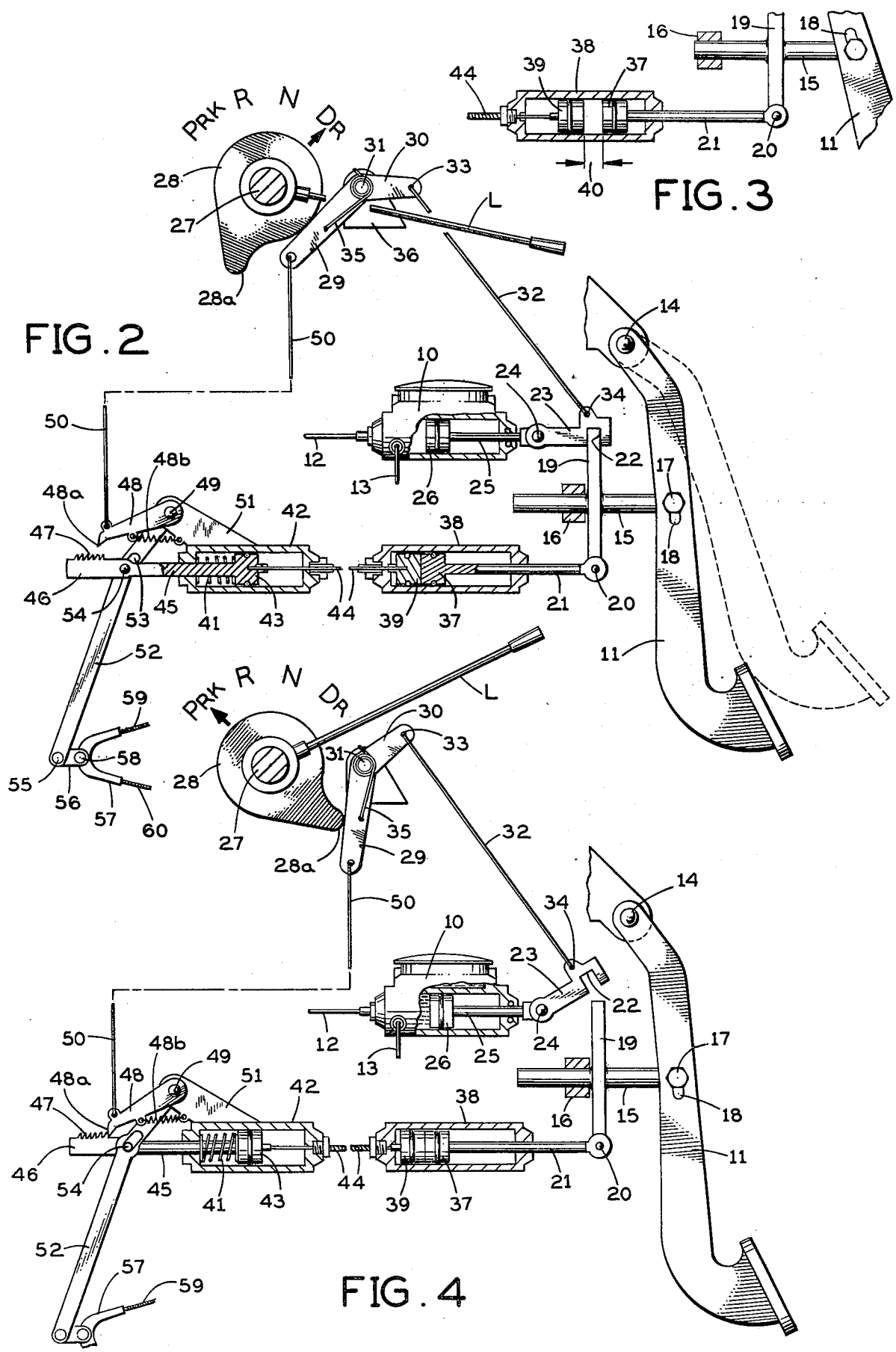

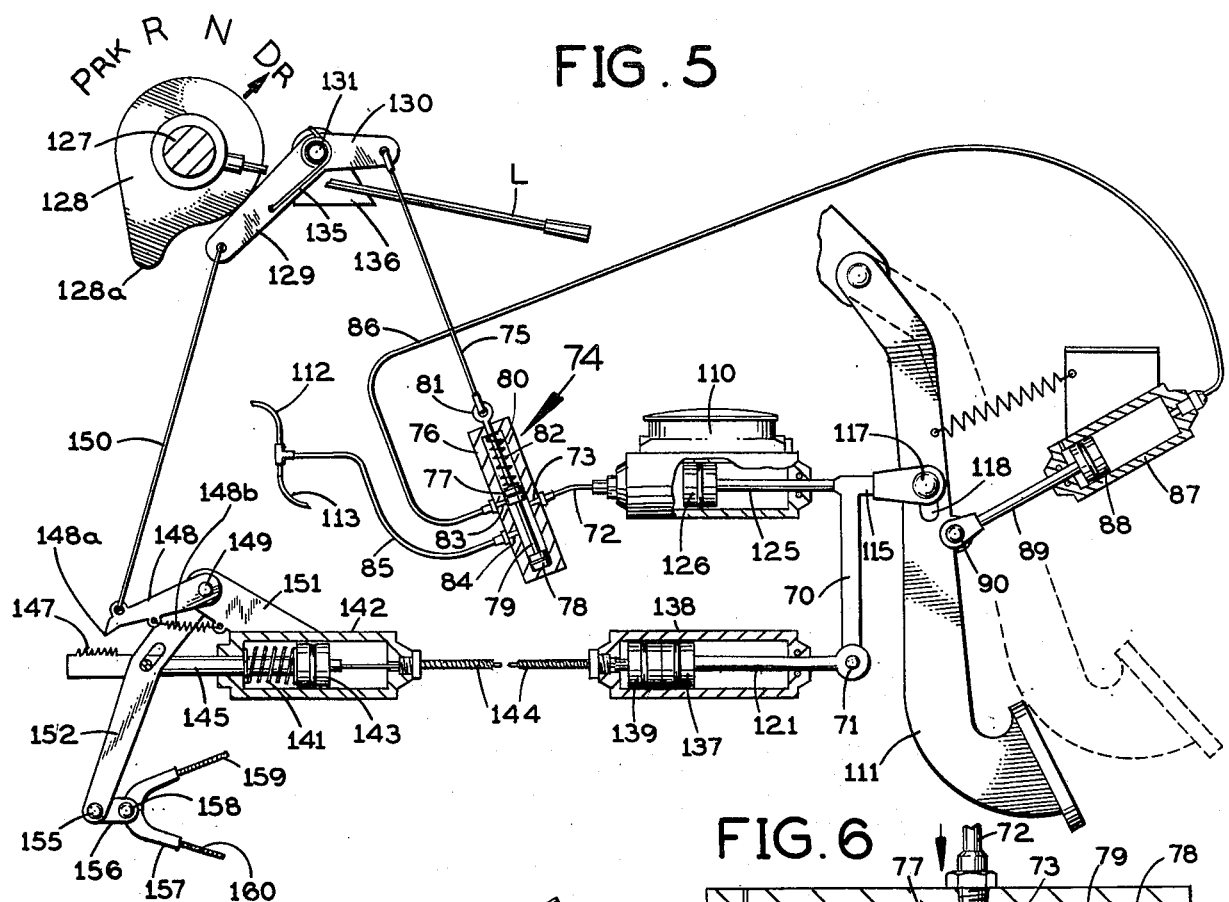
FIG. 5
FIG. 6
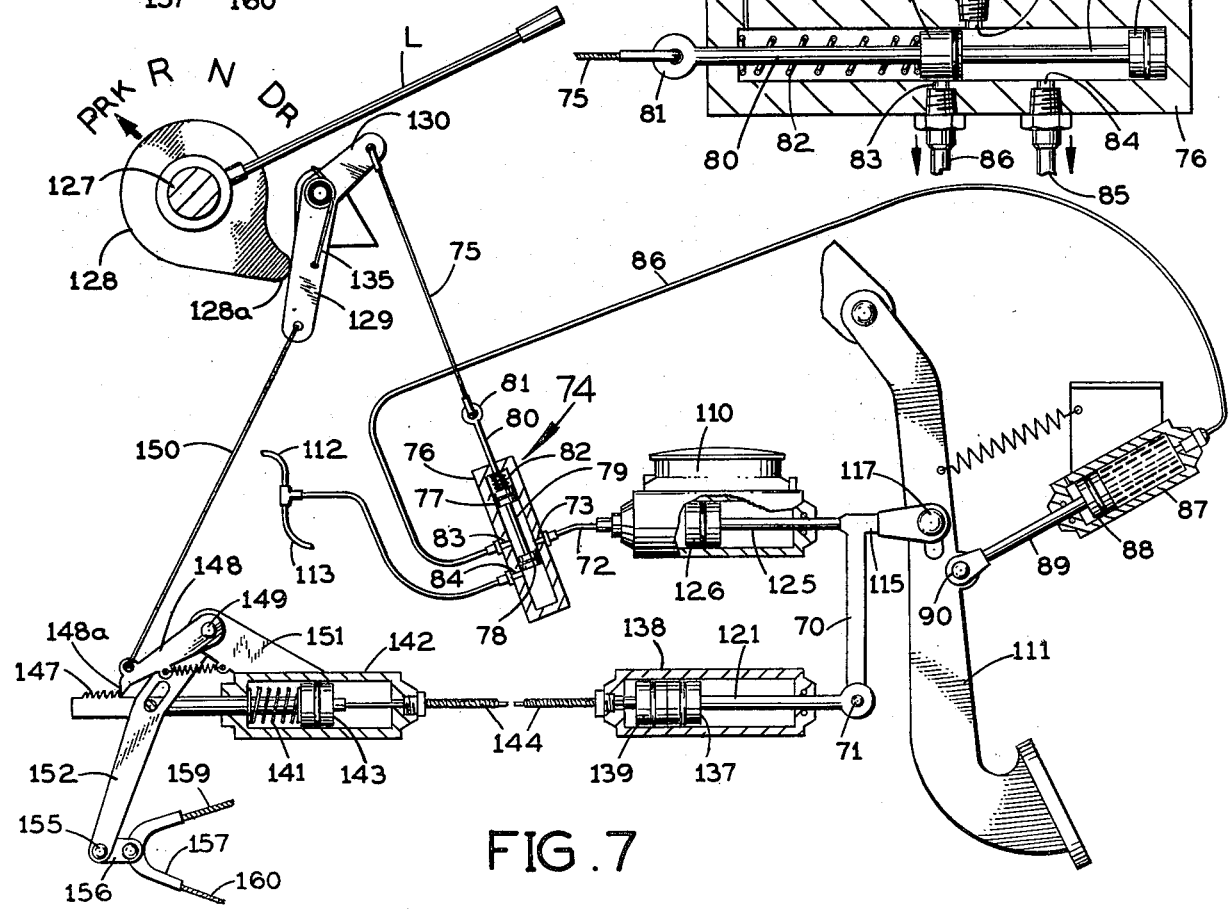
FIG. 7

EMERGENCY AND PARKING BRAKE ARRANGEMENT IN VEHICLE BRAKING SYSTEM

SUMMARY OF THE INVENTION

This invention relates to a vehicle braking system having a novel emergency and parking brake arrangement.

One aspect of this invention is directed to a novel arrangement for applying brakes in an emergency caused by a malfunction in the normal hydraulic brake system on a moving vehicle. In the event of such a malfunction, the resultant overtravel of the brake pedal when depressed by the driver actuates a mechanical linkage which applies rear wheel brakes to bring the vehicle safely to a stop.

Another aspect of this invention is directed to a novel parking braking arrangement on a vehicle with an automatic transmission. After the car has been brought to a stop and the automatic transmission shift lever has been put in its "park" position, the parking brake can be applied by depressing the brake pedal as for normal braking.

Preferably, the present invention provides a unitary emergency and parking brake arrangement having a mechanical linkage for applying rear brakes, either for emergency braking or for parking braking, in response to depression of the brake pedal in either case.

One principal object of this invention is to provide a novel emergency braking system for a vehicle which operates in case of a malfunction in the vehicle's usual fluid pressure-operated braking system.

Another object of this invention is to provide such an emergency braking system having a mechanical brake-applying linkage operated in response to overtravel of the brake pedal when it is depressed for normal braking and a pressure failure has occurred in the normal fluid pressure-operated brake system.

Another principal object of this invention is to provide for a vehicle with an automatic transmission a novel parking brake arrangement which is operated from the brake pedal that is used for normal braking when the vehicle is moving.

Another object of this invention is to provide a novel vehicle emergency and parking brake arrangement which does not require a hand or foot-operated actuator that is separate and distinct from the brake pedal used for normal braking.

Further objects and advantages of this invention will be apparent from the following detailed description of two presently-preferred embodiments which are illustrated schematically in the accompanying drawings.

DESCRIPTION OF THE DRAWINGS

FIG. 2 shows certain of the operating parts of this system for emergency braking when there is a loss of pressure in the usual hydraulic system while the vehicle is moving;

FIG. 3 is a fragmentary view showing the lost-motion coupling in the emergency and parking brake mechanism;

FIG. 4 is a view similar to FIG. 2 but showing the same operating parts for parking brake operation;

FIG. 5 is a schematic diagram of a vehicle braking system having an emergency and parking brake mechanism in accordance with a second embodiment of this invention, showing emergency braking operation;

FIG. 6 is an enlarged longitudinal section through a valve in the FIG. 5 system; and FIG. 7 is a view similar to FIG. 5 but showing parking brake operation.

DETAILED DESCRIPTION

Figure 1:
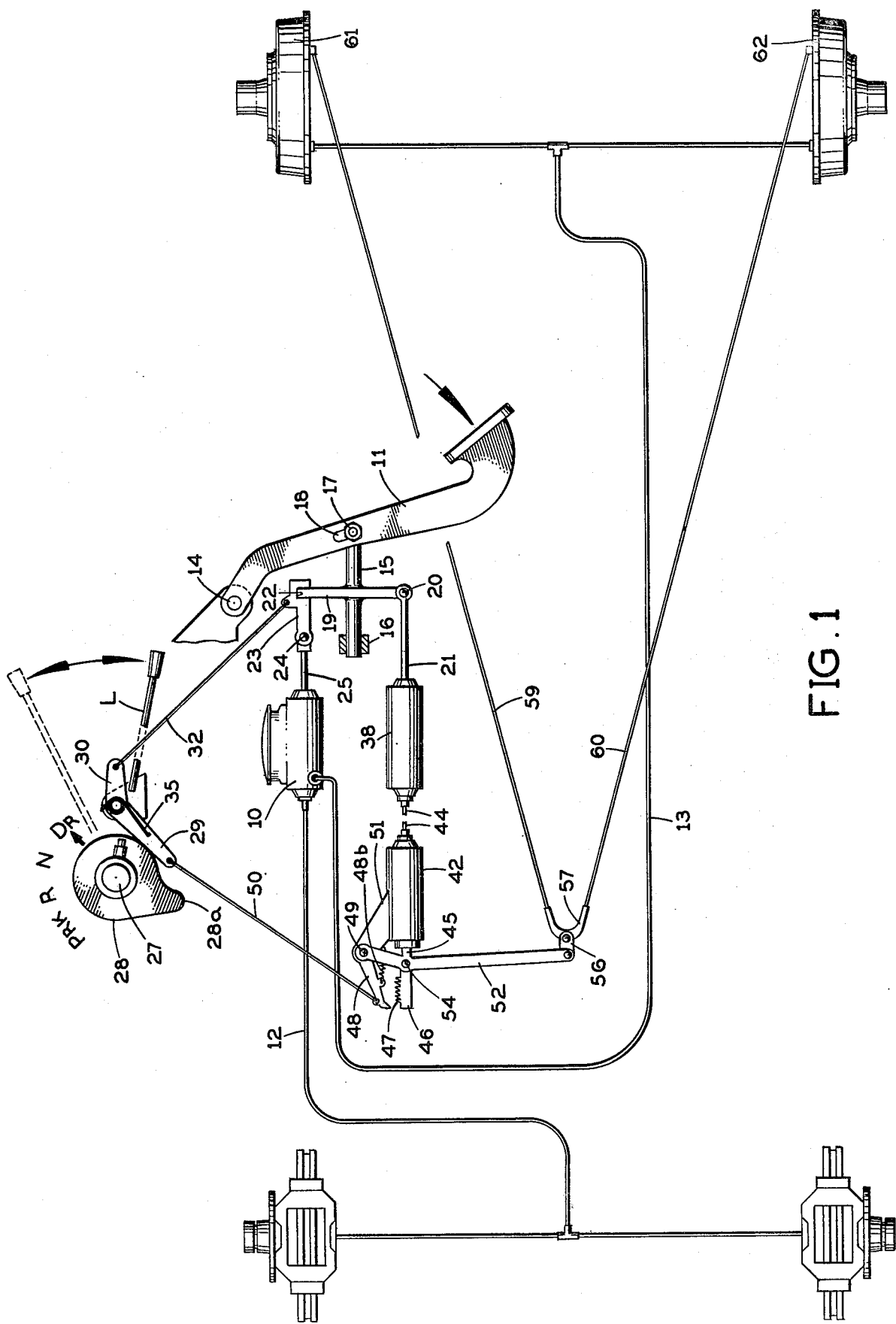
FIG. 1 is a schematic diagram of a vehicle braking system which includes an emergency and parking brake mechanism in accordance with a first embodiment of the present invention.

Before explaining the disclosed embodiments of the present inventions in detail, it is to be understood that the invention is not limited since the invention is capable of other embodiments. Also, the terminology used herein is for the purpose of description and not of limitation.

FIGS. 1-4

FIG. 1 shows a vehicle braking system which in part has the usual hydraulic brake arrangement with a master cylinder 10 operated by the brake pedal 11 to apply hydraulic pressure through front and rear hydraulic lines 12 and 13 to the brakes on the front and rear wheels of the vehicle. The vehicle has an automatic transmission controlled by a shift lever L.

In accordance with this first embodiment of the invention the brake pedal 11, which is suspended from a fixed horizontal pivot 14, is mechanically coupled to a horizontal rod or shaft 15 which is slidably received in a fixed ring 16 for reciprocation longitudinally of the vehicle. FIG. 1 shows shaft 15 in its normal, rearwardly retracted position before the brake pedal 11 is depressed. FIG. 2 shows shaft 15 in its forwardly extended position after the brake pedal 11 has been depressed more than the usual distance because of a hydraulic failure in the regular hydraulic braking system, permitting overtravel of the brake pedal. A cross pin 17 on the rear end of shaft 15 is slidably received in an arcuate slot 18 in the brake pedal 11 so that pivotal movement of the brake pedal produces horizontal movement of shaft 15 longitudinally of the vehicle.

Midway along its length the shaft 15 carries a vertical cross piece 19 which, as shown in FIG. 2, is engageable with the shaft-guiding ring 16 to limit the forward movement of shaft 15. The lower end of cross piece 19 is pivotally connected at 20 to a horizontally reciprocable piston rod 21, which is part of a mechanical lost-motion mechanism, as explained hereinafter. The upper end of cross piece 19 is engageable in a complementary downwardly-facing notch or slot 22 in a rigid coupling member 23 near its rear end.

The front end of coupling member 23 is pivotally connected at 24 to the rear end of a reciprocable piston rod 25 which extends horizontally forward into the master cylinder 10 and is attached to the master cylinder piston 26 (FIG. 2). As shown in FIG. 1, when the automatic transmission shift lever L is in the "drive" position, the coupling member 23 extends horizontally forward from the upper end of cross piece 19 on shaft 15, with its downwardly-facing slot 22 snugly engaging the top of cross piece 19 so that coupling member 23 will move forward horizontally in unison with shaft 15 when brake pedal 11 is depressed.

The shift lever L is angularly adjustable about a horizontal shaft 27 and it carries a cam 28. The periphery of this cam engages the front of a downwardly and forwardly inclined lower leg 29 of a cam follower, which has a rearwardly extending upper leg 30. The cam follower is horizontally pivoted at 31 at the connection between its lower and upper legs. A wire rod 32 has its upper end received in an opening 33 in the upper leg 30 of the cam follower and its lower end received in an opening 34 in coupling member 23. A torsion spring 35 acts between the cam follower 29, 30 and a fixed support member 36 to bias the cam follower clockwise in FIG. 2 so that its lower leg 29 bears against the periphery of cam 28.

When the shift lever L is in the "drive" position (FIG. 2), the cam 28 and cam follower 29, 30 are positioned so that coupling member 23 engages the cross plate 19 on shaft 15. When the shift lever L is pivoted counterclockwise from the FIG. 2 "drive" position to the "park" position, shown in FIG. 4, the rise 28a on cam 28 engages the lower leg 29 of the cam follower and rotates the latter counterclockwise from its FIG. 2 position to its FIG. 4 position. The cam follower pivots about 31 and pulls up on rod 32, raising the coupling member 23 counterclockwise about its pivot 24 to disengage it from the cross piece 19 on shaft 15. This uncouples the master cylinder piston 26 from the brake pedal 11, so that normal braking cannot occur.

The piston rod 21, which is pivotally coupled at 20 to the lower end of cross piece 19 on shaft 15, is attached at its front end to a piston 37 slidably received in a fixed horizontal cylinder 38. A second piston 39 is slidably received in cylinder 38 in front of piston 37. No water, hydraulic fluid or air is trapped between the pistons 37 and 39, so they simply provide a lost-motion coupling. In normal operation of the brake system from the master cylinder, after the brake pedal 11 has been fully depressed to apply the brakes, as shown in FIG. 3 the rear piston 37 in cylinder, 38 will not have moved forward far enough to engage the front piston 39, but instead there remains a gap 40 between them.

The front piston 39 of the lost-motion coupling is biased to the position shown in FIG. 3 by a compression coil spring 41 (FIG. 2) in a cylinder 42 located in front of cylinder 38. Spring 41 is engaged under compression between the front wall of cylinder 42 and a piston 43 slidable in cylinder 42 and coupled to the front piston 39 in cylinder 38 through a rod 44 extending between these cylinders. If there is a leak in the hydraulic brake system or a malfunction of the master cylinder 10 or any of the wheel brake cylinders such that the normal depression of brake pedal 11 will not apply the brakes, the brake pedal can overtravel from the normal stopping position, shown in phantom in FIG. 2, to the full-line position in FIG. 2. When this happens, the rear piston 37 in cylinder 38 engages the front piston 39 and moves it forward. This movement of piston 39 is imparted through rod 41 to the piston 43 in cylinder 42.

Piston 43 carries a forwardly-extending piston rod 45 which extends through the front wall of cylinder 42 and has a rigid extension 46 formed with ratchet teeth 47 on top. A pawl 48 is horizontally pivoted at its rear end at 49 and has a downwardly projecting tooth 48a at its front end for locking engagement with back face of any of the ratchet teeth 47. The front faces of the ratchet teeth are inclined upward and rearward so that forward movement of the ratchet would not be restrained by the pawl 48 if its tooth 48a engages the ratchet teeth 47. A wire rod or flexible cable 50 extends down from the lower leg 29 of the cam follower 23, 30 to the pawl 48. For ease of illustration this cable is shown in two longitudinally offset segments in FIGS. 2 and 4 but in actuality it would be a single, continuous, straight length as shown in FIG. 1. The horizontal pivot 49 for pawl 48 is on a rigid support arm 51 extending up from cylinder 42. A tension spring 48b acts between support arm 51 and pawl 48 to bias the pawl counterclockwise in FIG. 2, i.e., toward engagement with the ratchet teeth 47. When the shift lever L is in its "drive" position (FIG. 1), the cam follower 29, 30 is positioned to pull up on pawl 48 (through cable 50) and hold it up away from engagement with the ratchet.

A bent linkage arm 52 extends down from the fixed pivot 49. This linkage arm is formed with a slot 53 which slidably receives a cross pin 54 carried by piston rod 45 to provide a sliding pivot between this piston rod and the linkage arm. The lower end of linkage arm 52 is pivotally connected at 55 to a short horizontal linkage arm 56 to which a U-shaped yoke 57 is pivotally attached at 58. Flexible cables 59 and 60 extend from the opposite sides of this yoke rearward to mechanical actuators for brakes on the rear wheels 61 and 62. When yoke 57 is moved forward on the vehicle (to the left in FIG. 1) it causes these brakes to be applied. Conversely, when yoke 57 moves rearward it released these brakes.

OPERATION-FIGS. 1-4

When the vehicle is in motion, depressing the brake pedal normally applies the front and rear brakes through the respective hydraulic lines 12 and 13 extending from the master cylinder 10. The brake pedal 11 is mechanically coupled to piston 26 in the master cylinder through shaft 15, cross piece 19, coupling member 23 and piston rod 25.

If there is a hydraulic system failure due to leakage in the master cylinder or any of the wheel cylinders or any of the hydraulic brake lines, the brakes would not be applied in response to a normal depression of brake pedal 11. In that case, the present invention provides emergency application of brakes on the rear wheels through yoke 57 and cables 59 and 60. As shown in FIG. 2, the overtravel of brake pedal 11 (beyond its usual movement when depressed to apply the brakes through the hydraulic brake system) causes the lost-motion piston 37 to engage piston 39 and move it forward in cylinder 38 (to the left in FIG. 2). This movement of piston 39 is imparted through rod 44 to piston 43 in the front cylinder 42. Piston rod 45 pivots the bent linkage arm 52 clockwise about its pivot 49, moving its lower end forward to pull cables 59 and 60 forward and apply the corresponding brakes.

The brake cables 59 and 60 also may be actuated for parking brake operation when the vehicle is stopped. When the driver puts the shift lever L in the "park" position (FIG. 4), this disconnects the pivoted linkage member 23 from the cross piece 19 on shaft 15. Therefore, the brake pedal 11 cannot now operate the master cylinder piston 26. However, the brake pedal 11 still is coupled mechanically through the lost-motion pistons 37 and 39, rod 44, piston 43 and piston rod 45 to the linkage arm 52 which operates brake cables 59 and 60. Therefore, depression of the brake pedal 11 will pivot linkage arm 52 clockwise about its pivot 49 and pull cables 59 and 60 forward to apply the corresponding rear brakes. When the driver next releases the brake pedal, the linkage arm 52 remains in its brake-applying position because pawl 48 engages ratchet 47 and locks piston rod 45 in its forwardly extended position. Pawl 48 is lowered to this locking position by spring 48b when the cam 28 operated by shift lever L pivots cam follower 29 counterclockwise to the position shown in FIG. 4.

FIGS. 5-7

The second embodiment of the invention, shown in FIGS. 5–7, has many components identical to those in the embodiment of FIGS. 1–4. These identical components in FIGS. 5–7 are given the same reference numerals plus 100 as in FIGS. 1–4 and need not be described in detail again.

In FIGS. 5–7, the brake pedal-operated shaft 115 is horizontally aligned with, and directly connected to, the master cylinder piston rod 125. This, of course, requires that the slot 118 in brake pedal 111 be farther up on the brake pedal than the corresponding brake pedal slot 18 in FIGS. 1–4. The brake pedal-operated shaft 115 is rigidly attached to a downwardly extending vertical rod 70 which is pivotally coupled at 71 to the piston rod 121 at the input side of the lost-motion coupling.

The master cylinder 110 of the hydraulic brake system on the vehicle has a single output line 72 which is connected to the inlet port 73 of a valve 74 operated by a rod or cable 75 whose upper end is connected to the rear leg 130 of cam follower 129, 130. Valve 74 has a housing 76 defining a cylindrical chamber in which a spool valve member is slidable. This spool valve member has an upper spool 77, a lower spool 78 and a rigid stem 79 extending between them. An upper rod 80 extends up from the upper valve spool 77 and passes through the top of valve housing 76 where it presents an eye 81 attached to the lower end of the pull rod or cable 75. A coil spring 82 is engaged under compression in the valve housing between the top wall of this housing and the upper valve spool 77 to bias the spool valve member downward.

When the transmission shift lever L is in the "drive" position (FIG. 5) the spool valve member is in its lowermost position. In this position (shown in enlarged detail in FIG. 6) the upper valve spool 77 blocks an upper outlet port 83 while the lower valve spool 78 is below a lower outlet port 84 so that hydraulic fluid can flow from the valve inlet port 73 around valve stem 79 to the lower outlet port 84. The lower outlet port 84 is connected through a line 85 to the hydraulic line 112 leading to both front brakes and to the hydraulic line 113 leading to both rear brakes. Therefore, in the position of valve 74 as shown in FIG. 5, normal braking is established from the master cylinder 110 under the control of brake pedal 111.

The upper outlet port 83 of valve 74 is connected through a hydraulic line 86 to one end of a booster cylinder 87 in which a piston 88 is slidable. Piston 88 is attached to a piston rod 89 extending through the opposite end of cylinder 87 and having its free end pivotally connected at 90 to the brake pedal 111. When the transmission shift lever L is in the "drive" position, valve 74 blocks the master cylinder outlet line 72 from the booster cylinder 87.

When the transmission shift lever L is in the "park" position (FIG. 7), valve 74 connects the outlet of master cylinder 110 to booster cylinder 87 and blocks it from the hydraulic brake lines 112 and 113. The valve spool member in valve 74 is pulled up to this position by the cam follower 129, 130 and cable or rod 75 when cam 128 rotates the cam follower to the FIG. 7 position.

OPERATION-FIG. 5–7

When the transmission shift lever L is in the "drive" position (FIG. 5), normal braking from the master cylinder is established through valve 74. Normally, depression of the brake pedal 111 will move the master cylinder piston 126 forward in master cylinder 110, applying hydraulic pressure through line 72, valve 74, line 85, and lines 112 and 113 to the front and rear brakes.

If there is a leak in the hydraulic brake system so that the brakes would not be applied in response to a normal depression of the brake pedal to the phantom line position in FIG. 5, the brake pedal, when depressed, can overtravel to the full line position in FIG. 5. Such overtravel of the brake pedal causes the piston 137 to engage piston 139 and move it forward in the lost-motion cylinder 138. This displacement of piston 139 is imparted through rod 144 to piston 143 in the front cylinder 142, and its piston rod 145 moves the linkage arm 152 clockwise about its pivot 149 to pull the cables 159 and 160 forward so as to apply the corresponding rear brakes. Therefore, a failure of the normal hydraulic brake system does not result in a complete absence of braking since rear brakes can be applied through the described mechanical linkage in response to overtravel of the brake pedal.

When the transmission shift lever L is in "park" (FIG. 7), valve 74 disables the master cylinder 110 from operating the hydraulic brakes. Depression of the brake-pedal 111 at this time will cause the lost-motion cylinder-and-piston device 137–139 to apply the rear brakes through cables 159 and 160 in the manner just described. The initial depression of the brake pedal applies hydraulic pressure from master cylinder 110 through valve 74 to booster cylinder 87, whose piston 88 applies additional force on the brake pedal for depressing it more. The pawl 148 engages ratchet 147 to lock the cables 159 and 160 in their brake-applying position, so that the rear brakes remain applied after the driver released the brake pedal.

The parking brake is released automatically when the shift lever L is moved out of its "park" position. When this happens, spring 135 moves the cam follower 129, 130 clockwise and through cable 150 the cam follower pulls the pawl 148 up out of engagement with the ratchet teeth 147, thereby releasing the parking brakes.

The same release of the parking brake takes place in the embodiment of FIGS. 1–4.

In the embodiment of FIGS. 5–7, when the parking brake is released by shifting lever L out of its "park" position, the valve 74 takes enough time to move back to its FIG. 5 position that fluid pressure in the booster cylinder 87 can be relieved through valve 74 into the normal hydraulic brake system. The release of the parking brake enables the return spring for brake pedal 111 to return it to its normal position, and in doing so it moves the booster cylinder piston 88 in a direction to displace fluid from the booster cylinder. This takes place before the upper valve spool 77 in valve 74 has moved down to a position completely blocking the port 83 connected to booster cylinder 87.

While the present invention has been disclosed in conjunction with a hydraulic brake system on a vehicle, it is to be understood that it may be applied as well to a vehicle having air brakes.

It will be evident from the foregoing detailed disclosure of two presently preferred embodiments that the present invention enables the driver to use the normal brake pedal for emergency braking or to apply a parking brake. The driver can apply the emergency brake without removing his foot from the brake pedal in case of failure of the fluid pressure-operated brake system. Instead, such failure will enable the brake pedal to overtravel in the brake-applying direction, and such overtravel causes the emergency brakes to be applied. When the vehicle is brought to a stop by depressing the brake pedal in the usual way, if the driver keeps the brake pedal depressed and moves the shift lever to its "park" position, the brake pedal will overtravel to actuate the mechanical linkage to apply the emergency/parking brakes and this linkage will be locked in its brake-applying position as long as the shift lever remains in "park". The same result is obtained by moving the shift lever into "park" and then depressing the brake pedal.

I claim:

1. A braking system for a vehicle having an automatic transmission operable by a shift lever having a "park" position, said braking system comprising:
   a fluid pressure-operated brake system for applying the vehicle brakes;
   a brake pedal for actuating said fluid pressure operated brake system to apply the brakes;
   a mechanical linkage which is operable to apply at least one brake on the vehicle independent of said fluid pressure-operated brake system;
   coupling means acting between the brake pedal and said linkage to operate the latter to apply said last-mentioned brake upon overtravel of the brake pedal when the latter is depressed;
   means for disabling said fluid pressure-operated brake system from applying the brakes in response to depression of the brake pedal when the shift lever is in its "park" position; said shift lever for the transmission also having a "drive" position;
   said fluid pressure-operated brake system including a master cylinder and a piston displaceable in one direction in said master cylinder to apply hydraulic pressure for engaging the brakes;
   means providing a mechanical coupling between the brake pedal and said piston in the master cylinder to displace said piston in said one direction in response to depression of the brake pedal;
   and means operable by said shift lever for engaging said mechanical coupling when the shift lever is in its "drive" position and for disengaging said mechanical coupling when the shift lever is in its "park" position.

2. A braking system for a vehicle having an automatic transmission operable by a shift lever having a "park" position, said braking system comprising:
   a fluid pressure-operated brake system for applying the vehicle brakes;
   a brake pedal for actuating said fluid pressure operated brake system to apply the brakes;
   a mechanical linkage which is operable to apply at least one brake on the vehicle independent of said fluid pressure-operated brake system;
   coupling means acting between the brake pedal and said linkage to operate the latter to apply said last-mentioned brake upon overtravel of the brake pedal when the latter is depressed;
   means operable by said shift lever for locking said mechanical linkage in its brake-applying position upon said overtravel of the brake pedal when the shift lever is in its "park" position;
   said mechanical linkage including a reciprocable member movable in one direction to apply said brake and in the opposite direction to release said brake, said reciprocable member having ratchet teeth thereon;
   a pivoted pawl engageable with said ratchet teeth to prevent movement of said reciprocable member in said opposite direction;
   spring means biasing said pawl into locking engagement with said ratchet teeth;
   and linkage means acting between said shift lever and said pawl to (a) hold said pawl disengaged from said ratchet teeth except when the shift lever is in its "park" position and (b) to permit said spring means to move said pawl into engagement with said ratchet teeth when the shift lever is in its "park" position;
   said coupling means including a lostmotion coupling acting between said brake pedal and said reciprocable member (a) to disengage engage said brake pedal from said reciprocable member during normal braking movement of the brake pedal, and (b) to operatively connect said brake pedal to said reciprocable member upon overtravel of the brake pedal beyond its normal braking movement.

3. A braking system for a vehicle having an automatic transmission operable by a shift lever having a "park" position, said braking system comprising:
   a fluid pressure-operated brake system for applying the vehicle brakes;
   a brake pedal for actuating said fluid pressure operated brake system to apply the brakes;
   a mechical linkage which is operable to apply at least one brake on the vehicle independent of said fluid pressure-operated brake system;
   coupling means acting between the brake pedal and said linkage to operate the latter to apply said last-mentioned brake upon overtravel of the brake pedal when the latter is depressed;
   means for disabling said fluid pressure-operated brake system from applying the brakes in response to depression of the brake pedal when the shift lever is in its "park" position;
   said shift lever for said transmission having a "drive" position;
   said fluid pressure-operated brake system including a master cylinder and a piston displaceable in one direction in said master cylinder to apply hydraulic pressure for engaging the brakes;
   a valve controlling the hydraulic pressure at the outlet side of said master cylinder;
   means acting between said shift lever and said valve for causing said valve to operatively connect the output of said master cylinder to the brakes when the shift lever is in its "drive" position and to disconnect the output of said master cylinder from the brakes when the shift lever is in its "park" position;
   a booster cylinder operatively connected to said valve to be blocked from fluid communication with the output of said master cylinder when the shift lever is in its "drive" position and to be in fluid communication with the output of said master cylinder when the shift lever is in its "park" position;
   and a piston slidable in said booster cylinder and operatively coupled to the brake pedal to move said pedal in its brake-applying direction in response to fluid pressure in said booster cylinder from said master cylinder.

4. A braking system according to claim 3, wherein said lost-motion coupling comprises:
   a first cylinder, a first piston slidable in said first cylinder and operatively coupled to the brake pedal to be moved in one direction in said cylinder in response to depression of the brake pedal, and a second piston in said first cylinder in confronting relationship to said first position;

a second cylinder, a piston slidable in said second cylinder, means connecting said piston in the second cylinder to said second piston in said first cylinder for movement in unison therewith, a piston rod extending from said piston in the second cylinder and operatively connected to said reciprocable member having said ratchet teeth thereon, and spring means in said second cylinder biasing said piston therein to a position holding said second piston in said first cylinder away from engagement by said first piston in said first cylinder upon normal braking movement of the brake pedal, so that such movement of the brake pedal is not imparted to said reciprocable member.

* * * * *